(12) United States Patent
Deore et al.

(10) Patent No.: US 12,715,384 B2
(45) Date of Patent: Aug. 25, 2026

(54) BULL BAR DROP-DOWN STRUCTURE

(71) Applicant: TOYOTA MOTOR ENGINEERING & MANUFACTURING NORTH AMERICA, INC., Plano, TX (US)

(72) Inventors: Prashant K. Deore, Canton, MI (US); Chris Sheehy, Ypsilanti, MI (US)

(73) Assignees: TOYOTA MOTOR ENGINEERING & MANUFACTURING NORTH AMERICA, INC., Plano, TX (US); TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 342 days.

(21) Appl. No.: 18/423,064

(22) Filed: Jan. 25, 2024

(65) Prior Publication Data

US 2025/0242772 A1 Jul. 31, 2025

(51) Int. Cl.
*B60R 19/52* (2006.01)
*B60R 19/26* (2006.01)

(52) U.S. Cl.
CPC .............. *B60R 19/52* (2013.01); *B60R 19/26* (2013.01); *B60R 2019/522* (2013.01)

(58) Field of Classification Search
CPC ...... B60R 19/52; B60R 9/26; B60R 2019/522
See application file for complete search history.

(56) References Cited

U.S. PATENT DOCUMENTS 3,715,138 A 2/1973 Finkle
6,315,338 B1 * 11/2001 Schneider ............... B60R 19/52 293/115
6,905,153 B2 6/2005 Murray
8,640,826 B1 2/2014 Beilstein
8,939,478 B2 1/2015 Fisher
9,834,162 B1 * 12/2017 Grey ........................ B60R 19/52
9,884,601 B1 * 2/2018 Candido ................. B60R 19/52
2005/0099028 A1 5/2005 Orton
2006/0157993 A1 * 7/2006 Pendarvis ............... B60R 19/24 293/132
2009/0284029 A1 11/2009 Rein
2009/0284030 A1 11/2009 Rein
2010/0001540 A1 1/2010 Barcomb
2013/0049384 A1 * 2/2013 Kekich, Jr. ............. B60R 19/52 293/115
2018/0201210 A1 * 7/2018 Ghannam ............... B60R 19/52
2022/0194309 A1 * 6/2022 Harding .................. B60R 19/54

FOREIGN PATENT DOCUMENTS

CN 107719289 A * 2/2018 ............. B60R 19/52
DE 102018100699 A1 * 7/2018 ............. B60R 19/48
EP 1992525 A1 * 11/2008 ............. B60R 19/34

* cited by examiner

*Primary Examiner* — Lori Lyjak
(74) *Attorney, Agent, or Firm* — HAYNES AND BOONE, LLP

(57) ABSTRACT

The systems, devices, and methods described herein relate to a mounting system for attaching a bull bar to a vehicle. This mounting system may include bull bar drop-down mounting devices that are attached to a vehicle frame. The bull bar drop-down mounting devices are also attached to a bull bar. In the event of a frontal collision, the bull bar drop-down mounting devices are arranged such that they apply pressure to the bull bar in a downward direction, forcing the bull bar to drop down below the level of the vehicle frame, which may help to avoid damage to the vehicle.

20 Claims, 8 Drawing Sheets

BULL BAR DROP-DOWN STRUCTURE

TECHNICAL FIELD

The present disclosure is directed to systems, devices, and methods for mounting a bull bar structure on a vehicle. In particular, the present disclosure includes a bull bar drop-down mounting structure that causes the bull bar to drop in the event of a frontal crash.

BACKGROUND OF THE DISCLOSURE

To increase the utility of large vehicles such a trucks, many drivers choose to install a bull bar on the front of the vehicle. Bull bars generally include one or more rigid metal bars that can be used in a variety of ways. For examples, bull bars can add extra protection to a vehicle by greatly increasing the strength and rigidity of the front portion of the vehicle, as well as adding towing anchors or other access points. Bull bars can also be used to carry extra equipment such as a winch, jack, antenna, lights, and other equipment. Some types of bull bars include specialized functions, such as providing for the attachment of agricultural equipment or a snow plow. Bull bars are typically heavy and are often mounted directly to the frame of a vehicle for sufficient support. However, in the event of a front impact to the vehicle, the rigid connection between the bull bar and the frame can cause problems. For example, the addition of a bull bar may decrease the crumple zone of a vehicle due to the rigid nature of the bull bar. Further, an impact to the bull bar may cause the frame to be bent out of place or may cause damage to other components of the vehicle.

Therefore, need exist for a bull bar mounting solution that mitigates damage in the event of a frontal impact.

SUMMARY

In some exemplary aspects, the present disclosure introduces a mounting device for attaching a bull bar to a vehicle, which may include: a first bracket including: a first base structure configured to be rigidly mounted to a frame structure of the vehicle, wherein the first base structure comprises a proximal portion, a first extension in a middle portion of the first base structure, and a second extension at a distal end of the first base structure; and a first flange configured to be rigidly mounted to the bull bar, the first flange connected to the proximal portion of the first base structure, the first flange extending perpendicular to first base structure; and a second bracket including: a second base structure configured to be rigidly mounted to the frame structure of the vehicle, wherein the second base structure comprises a proximal portion, a third extension in a middle portion of the second base structure, and a fourth extension at a distal end of the second base structure; and a second flange configured to be rigidly mounted to the bull bar, the second flange connected to the proximal portion of the second base structure, the second flange extending perpendicular to second base structure.

In some implementations, the proximal portion of the first base structure and the first extension each comprise a ramped shape configured to force the bull bar to drop during a frontal crash. The proximal portion of the second base structure and the third extension may each include a ramped shape configured to force the bull bar to drop during a frontal crash. The mounting device may also include one or more bolts that pass through the first flange and the bull bar, the one or more bolts configured to rigidly attach the first bracket to the bull bar. The mounting device may also include one or more bolts that pass through the second flange and the bull bar, the one or more bolts configured to rigidly attach the second bracket to the bull bar.

In some implementations, the first extension and the second extension both include semicircular cutouts configured to allow bolts to pass therethrough to rigidly attach the first bracket to the frame structure of the vehicle. The third extension and the fourth extension may both include semicircular cutouts configured to allow bolts to pass therethrough to rigidly attach the second bracket to the frame structure of the vehicle. A first rib may be included that extends along and connecting together a central portion of the first base structure and the first flange. A second rib may also be included that extends along and connecting together a central portion of the second base structure and the second flange. The first flange and the second flange may extend in opposite directions. The first base structure and the second base structure may extend parallel to each other.

A mounting system for attaching a bull bar to a vehicle is also contemplated, including: a vehicle frame structure with a first mounting structure; a first bracket comprising a first base structure with a proximal portion, a first extension, a second extension, and a first flange extending perpendicular to the proximal portion of the first bracket; a second bracket comprising a second base structure with a proximal portion, a third extension, a fourth extension, and a second flange extending perpendicular to the proximal portion of the second bracket; and a bull bar with a second mounting structure, wherein the first bracket and the second bracket are rigidly connected to the first mounting structure and the second mounting structure.

In some implementations, the proximal portion of the first base structure and the first extension each comprise a ramped shape configured to force the bull bar to drop during a frontal crash. The proximal portion of the second base structure and the third extension may each comprise a ramped shape configured to force the bull bar to drop during a frontal crash. One or more bolts may also be included that pass through the first flange and the bull bar, the one or more bolts configured to rigidly attach the first bracket to the bull bar. The mounting system may also include one or more bolts that pass through the second flange and the bull bar, the one or more bolts configured to rigidly attach the second bracket to the bull bar. The first extension and the second extension may both include semicircular cutouts configured to allow bolts to pass therethrough to rigidly attach the first bracket to the vehicle frame structure.

A method for attaching a bull bar to a vehicle is also contemplated, including: providing a vehicle frame with a first mounting structure; attaching a first bracket to the first mounting structure by passing one or more bolts through a first cutout and a second cutout in the first bracket and into one or more holes in the first mounting structure; attaching a second bracket to the first mounting structure by passing one or more bolts through a third cutout and a fourth cutout in the second bracket and into one or more holes in the first mounting structure; attaching the first bracket to a bull bar mounting structure; and attaching the second bracket to the bull bar mounting structure, wherein the first, second, third, and fourth cutouts are configured to force the bull bar to drop in an event of a frontal crash.

In some implementations, the method may include attaching the first bracket to the bull bar mounting structure by passing one or more bolts through holes in a first flange of the first bracket and through one or more holes in the bull bar mounting structure; and attaching the second bracket to the bull bar mounting structure by passing one or more bolts through holes in a second flange of the second bracket and through one or more holes in the bull bar mounting structure. Each of the first, second, third, and fourth cutouts may include a ramped shape.

BRIEF DESCRIPTION OF THE DRAWINGS

Other systems, methods, features, and advantages of the present invention will be or will become apparent to one of ordinary skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

DETAILED DESCRIPTION

The present disclosure describes devices, systems, and methods for mounting a bull bar to a vehicle. In particular, the present disclosure provides for a bull bar drop-down mounting structure that is configured to securely attach a bull bar to a vehicle frame and will cause the bull bar to drop down in the event of a frontal crash.

An exemplary mounting system includes one or more bull bar drop-down structures that are bolted to or otherwise connected to both the vehicle frame and a bull bar.

Figure 1:
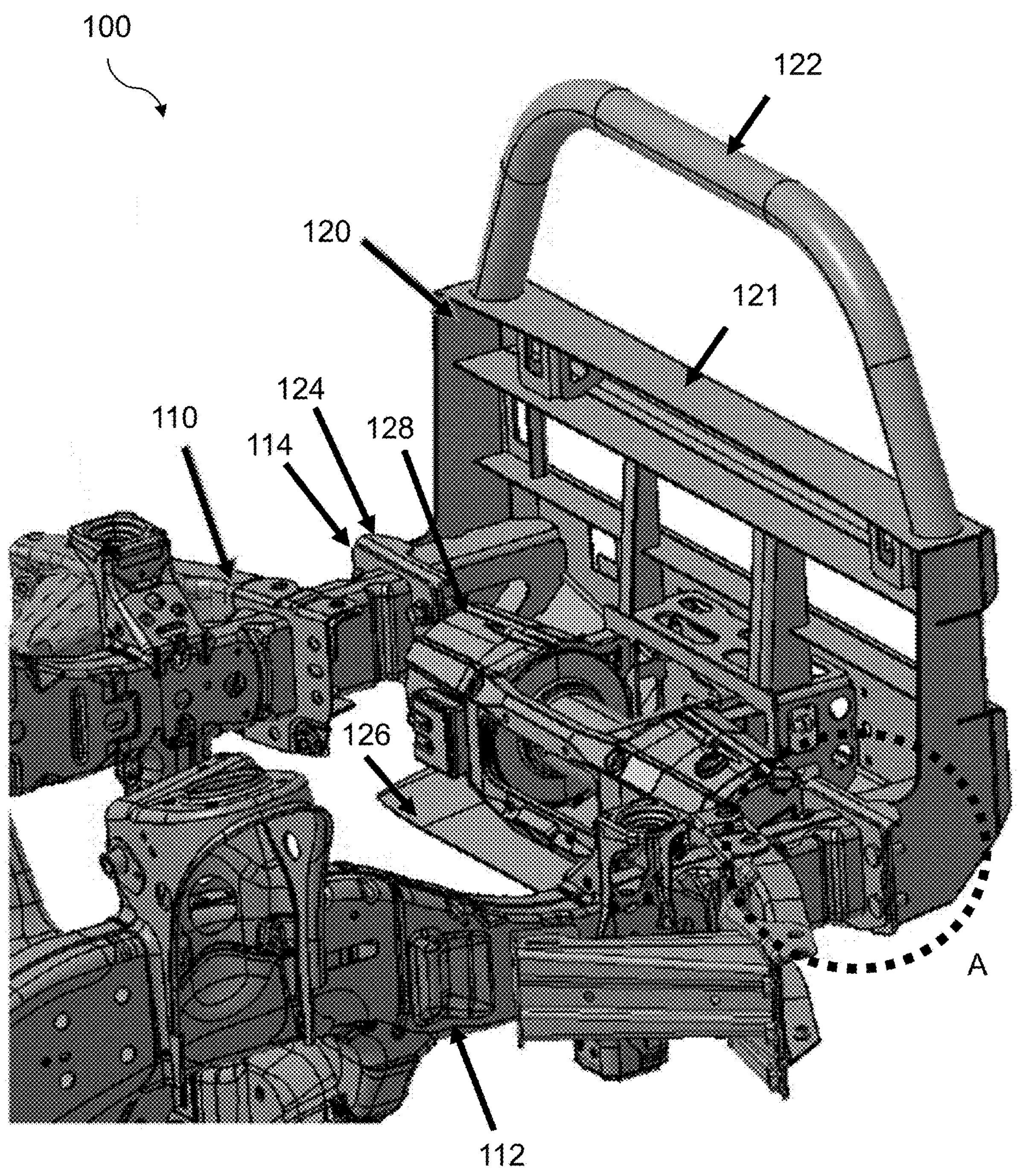
FIG. 1 is a diagram of an existing bull bar mounted on a vehicle frame.

FIG. 1 shows a diagram 100 of an existing bull bar 120 mounted on a vehicle frame 110. The bull bar may include a main structure 121, bar 122, mounting structure 124, support 126, and equipment 128 (which in the example of FIG. 1 is a winch). The vehicle frame 110 may include frame rails 112 and mounting structure 114. FIG. 1 shows a typical rigid mounting arrangement where the mounting structure 124 of the bull bar is bolted directly onto the mounting structure 114 of the vehicle frame.

Figure 2:
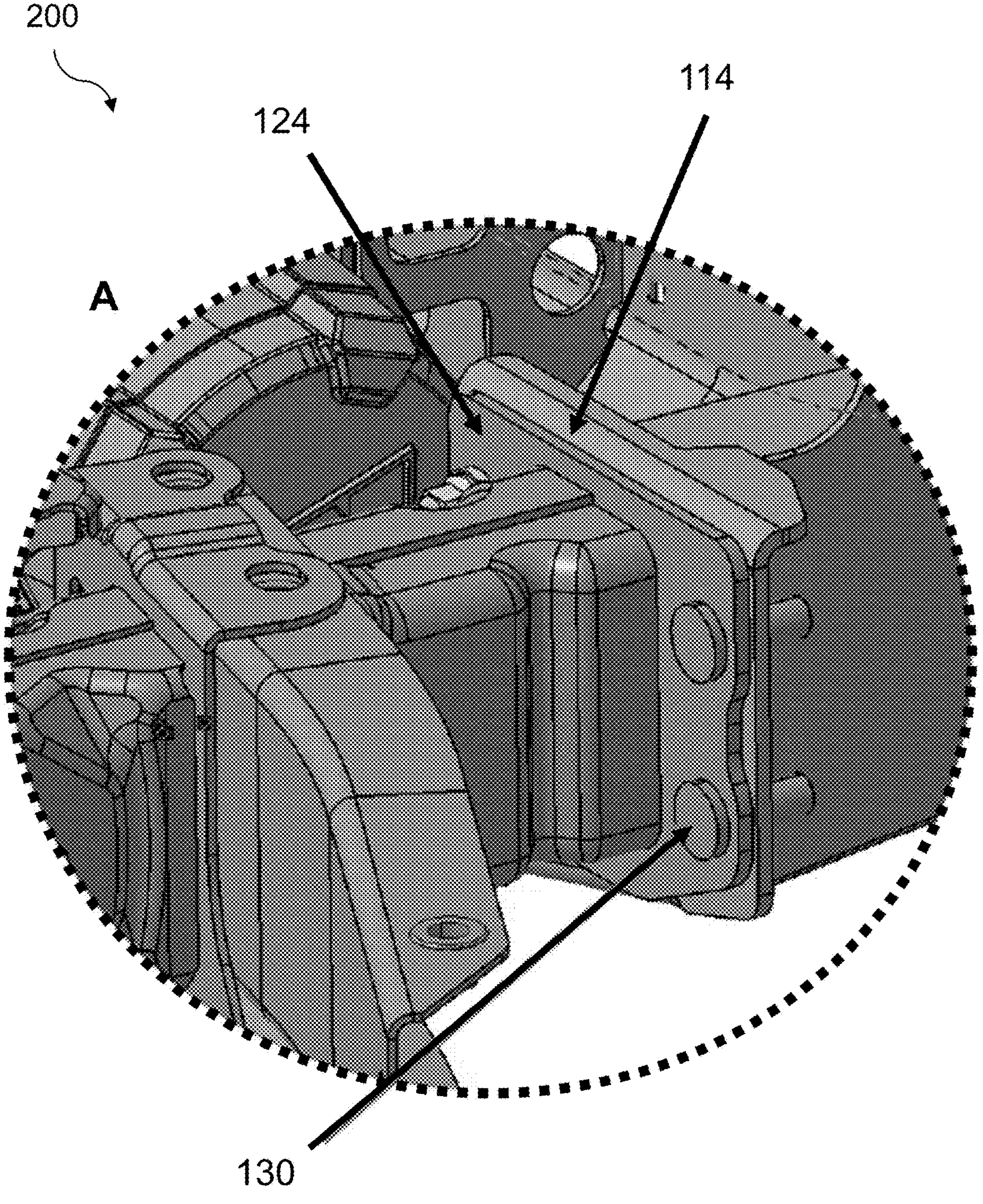
FIG. 2 is a magnified diagram of FIG. 1 showing the connection between the existing bull bar and vehicle frame.

FIG. 2 shows a magnified view 200 of area A in FIG. 1 and further shows the typical rigid mounting arrangement. In particular, bolts 130 pass through the mounting structure 124 of the bull bar and the mounting structure 114 of the vehicle. This type of mounting arrangement rigidly attaches the bull bar to the vehicle and minimizes movement between the bull bar and vehicle. However, this arrangement becomes problematic during a frontal impact. In this case, energy is transferred directly from the bull bar into the vehicle frame which may result in costly deformation of the vehicle frame and damage to other components. The bull bar may also sustain serious damage in this arrangement. Further, since bull bars themselves are very rigid, the front crumple zone of the vehicle is greatly reduced, meaning that energy created in a collision is transferred directly to the vehicle instead of being absorbed by a more pliable bumper structure.

Figure 3:
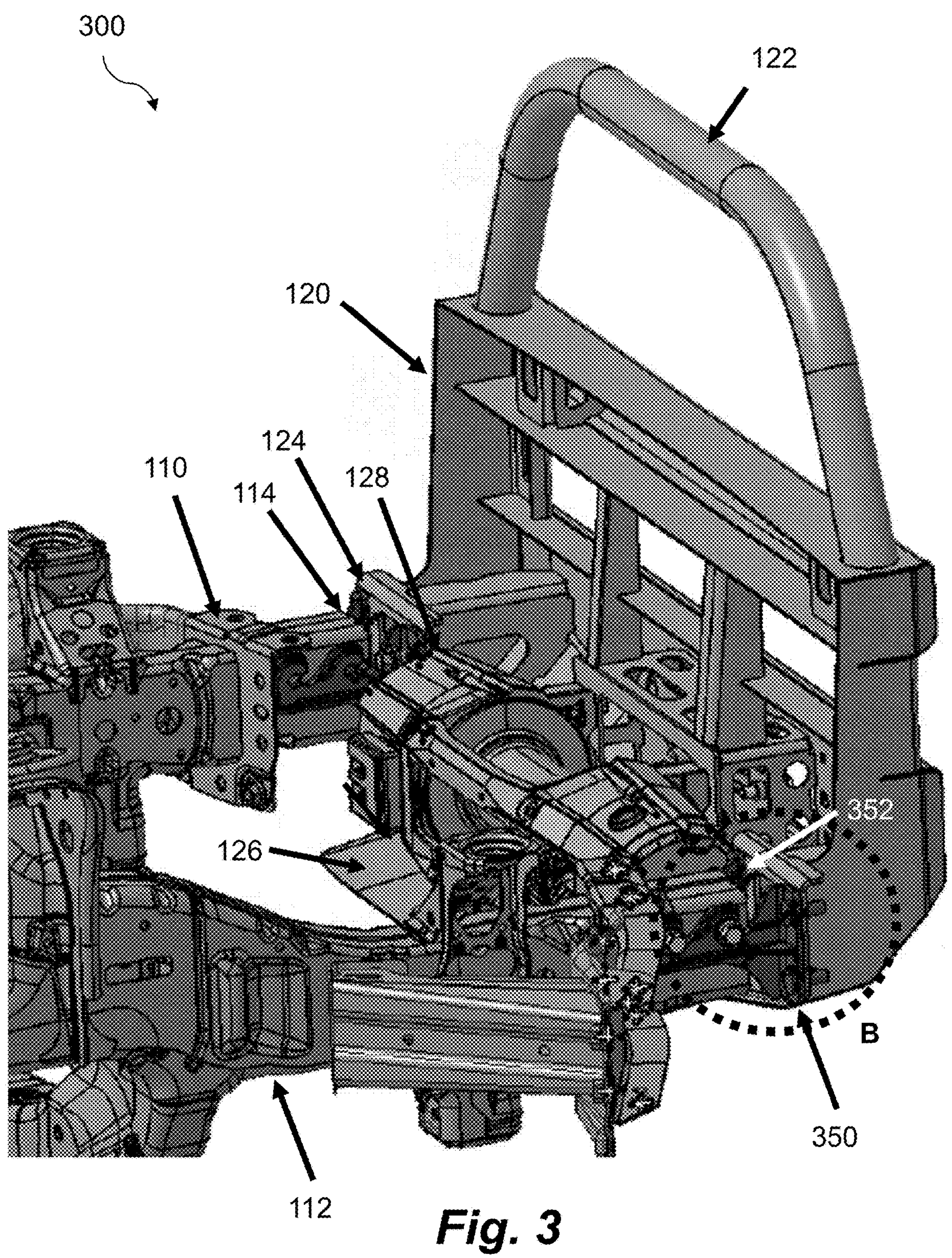
FIG. 3 is a diagram of a bull bar mounted on a vehicle frame according to embodiments of the present invention.

FIG. 3 shows a diagram 300 of an exemplary structure for mounting the bull bar 120 to the vehicle frame 110. In this example, bull bar drop-down mounting structures (first and second brackets) 350, 352 are attached to the vehicle frame 110, for example on an extended frame rail. The bull bar 120 is then attached to the bull bar drop-down mounting structures 350, 352. As shown in FIG. 3, two sets of bull bar drop-down mounting structures 350, 352 may be attached to the vehicle frame, for example, on each of the frame rails. In some implementations, the bull bar drop-down mounting structure 350 is symmetrical to bull bar drop-down structure 352 (i.e., configured for righthand and lefthand mounting, but identical otherwise). This arrangement may reduce damage and injury in the event of a crash by causing the bull bar 120 to detach from the vehicle frame (and drop down) instead of transferring energy directly to the vehicle frame as in a typical mounting arrangement.

Figure 4:
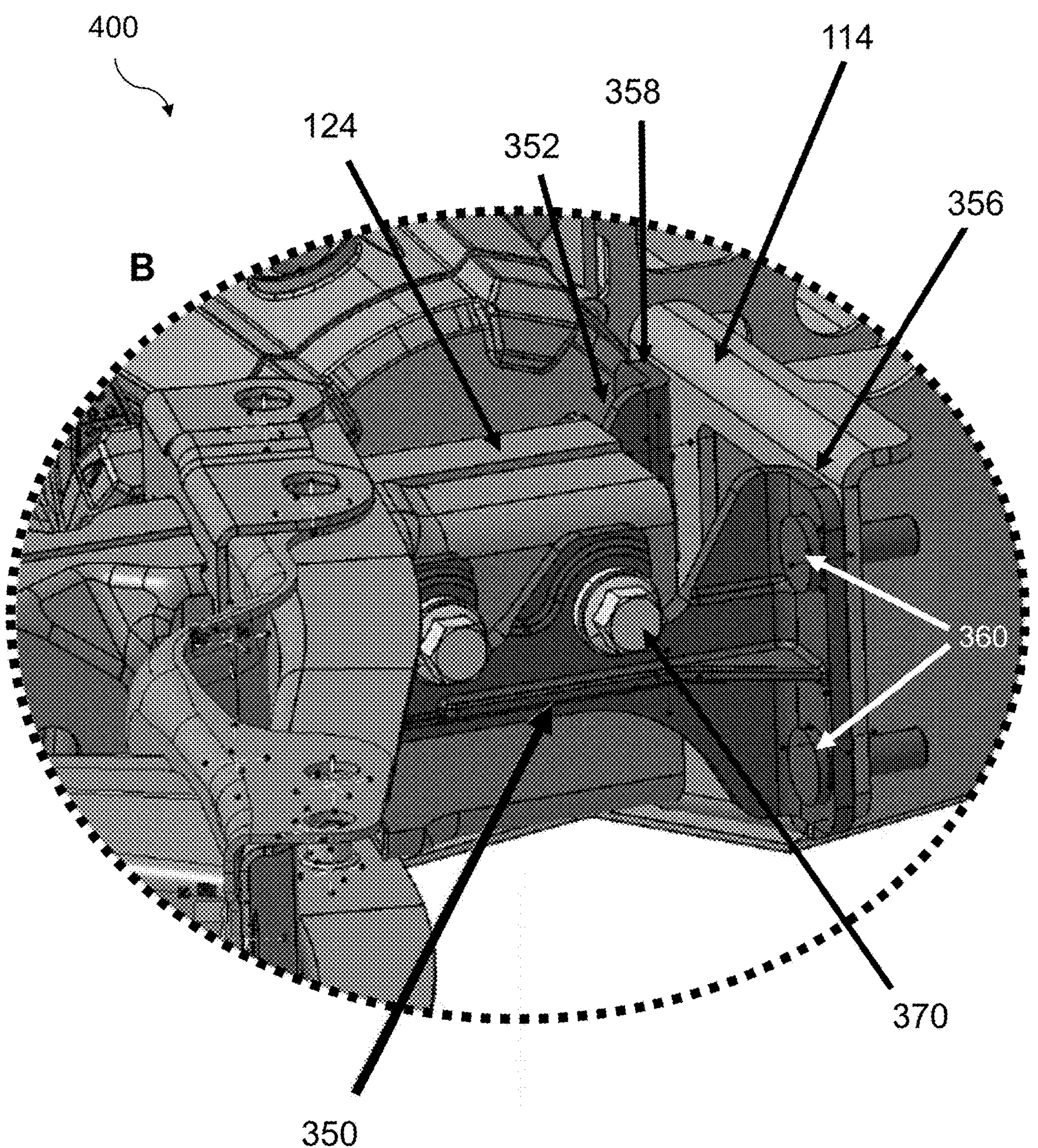
FIG. 4 is a magnified diagram of FIG. 3 showing a bull ball drop-down structure connecting the bull bar to the vehicle frame according to embodiments of the present invention.

FIG. 4 shows a magnified view 400 of area B in FIG. 3 and further shows an exemplary mounting arrangement with the bull bar drop-down mounting structures 350, 352. This view shows bolts 370 that pass through the bull bar drop-down mounting structures 350, 352 and vehicle frame, rigidly connected them together. In other implementations, the bull bar drop-down mounting structures 350, 352 may be attached to the vehicle frame by other devices, such as pins, screws, or other mounting devices. The bolts 370 may pass through cutout portions of the bull bar drop-down mounting structures 350, 352 that are shaped in such a way as to force the bull bar down in the event of a frontal collision.

In some implementations, a second set of bull bar drop-down mounting structures 350, 352 are also attached to the vehicle frame, such as on a second frame rail. This second set may be similar to the first set, including having flanges that bend out from the frame rail in opposite directions.

The connection between the drop-down mounting structures 350, 352 and the bull bar mounting structure 114 is also shown in FIG. 4. Bolts 360 may pass through the drop-down mounting structures 350, 352 and bull bar mounting structure to rigidly attach these elements together. In some implementations, bolts 360 are M12 studs. In the case of a frontal collision, bolts 360 may be configured to shear such that the bull bar mounting structure 114 separates from the drop-down mounting structures 350, 352. This may prevent damage to the frame and other components of the vehicle. In the example of FIG. 4, two drop-down mounting structures 350, 352 are shown with slightly different orientations. In particular, bull bar drop-down mounting structures 350 may include a first flange 356 that extends in a direction roughly perpendicular to the main body of the drop-down mounting structure 350. The bull bar drop-down mounting structure 352 may include a second flange 358 that extends in a direction roughly perpendicular the main body of the drop-down mounting structure 352 and in an opposite direction as first flange 356, such that the first flange 356 and second flange 358 are oriented roughly in the same plane. This mounting arrangement may provide a secure connection to the bull bar during normal use and even during minor impacts (such as hitting a deer or a rock), but cause the bull bar to drop down in the case of a serious accident.

Figure 5:
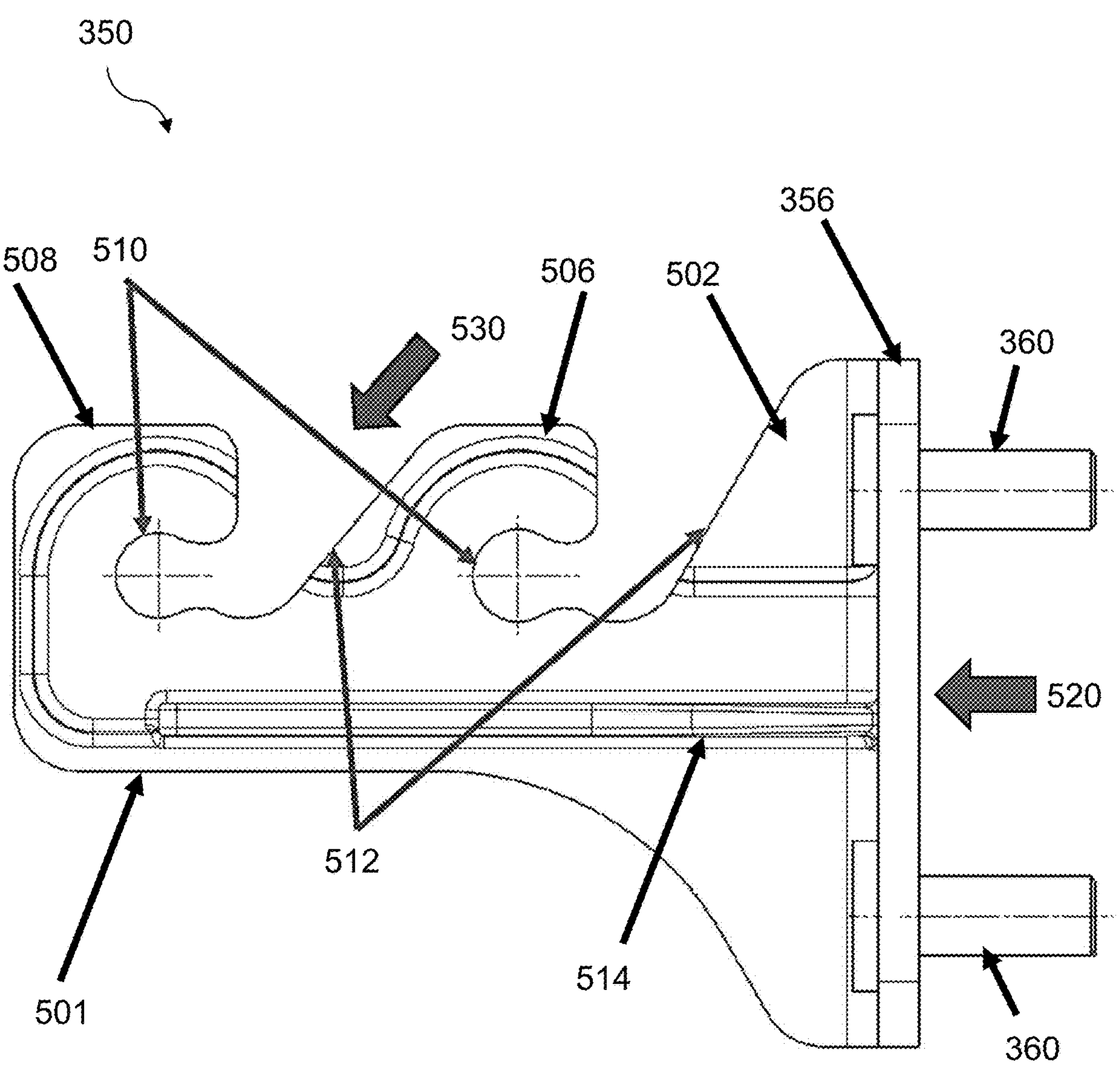
FIG. 5 is a diagram illustrating a bull bar drop-down structure according to embodiments of the present invention.

FIG. 5 shows further details of the bull bar drop-down mounting structure 350. The bull bar drop-down mounting structure 350 may appear as a reinforced bracket and may include a main body (first and second base structures) 501, with a proximal portion 502, a first extension 506, and a second extension 508, as well as a flange 356. A rib 514 may be included to add strength to the bull bar drop-down mounting structure 350 and connect the flange 356 to the main body 501 of the bull bar drop-down mounting structure 350. The rib 514 may extend along a central portion of the main body 501 and connect to a central portion of the flange 356. Cutouts 510 may be positioned in the bull bar drop-down mounting structure 350 as shown in the example of FIG. 5. In some implementations, the cutouts 510 have a diameter of about 10 mm. These cutouts 510 may include a circular portion and may also include ramps 512 that extend from a central portion of the bull bar drop-down mounting structure 350 to an upper portion of the bull bar drop-down mounting structure 350. This arrangement of the cutouts 510 may provide for a strong, rigid connection of the bull bar drop-down mounting structure 350 to the vehicle frame, for example, by passing bolts through the circular portions of the cutouts 510.

Figure 7:
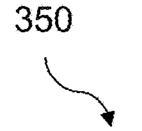
FIG. 7 is a diagram illustrating a bull bar drop-down structure mounting to a vehicle frame according to embodiments of the present invention.
Figure 7:
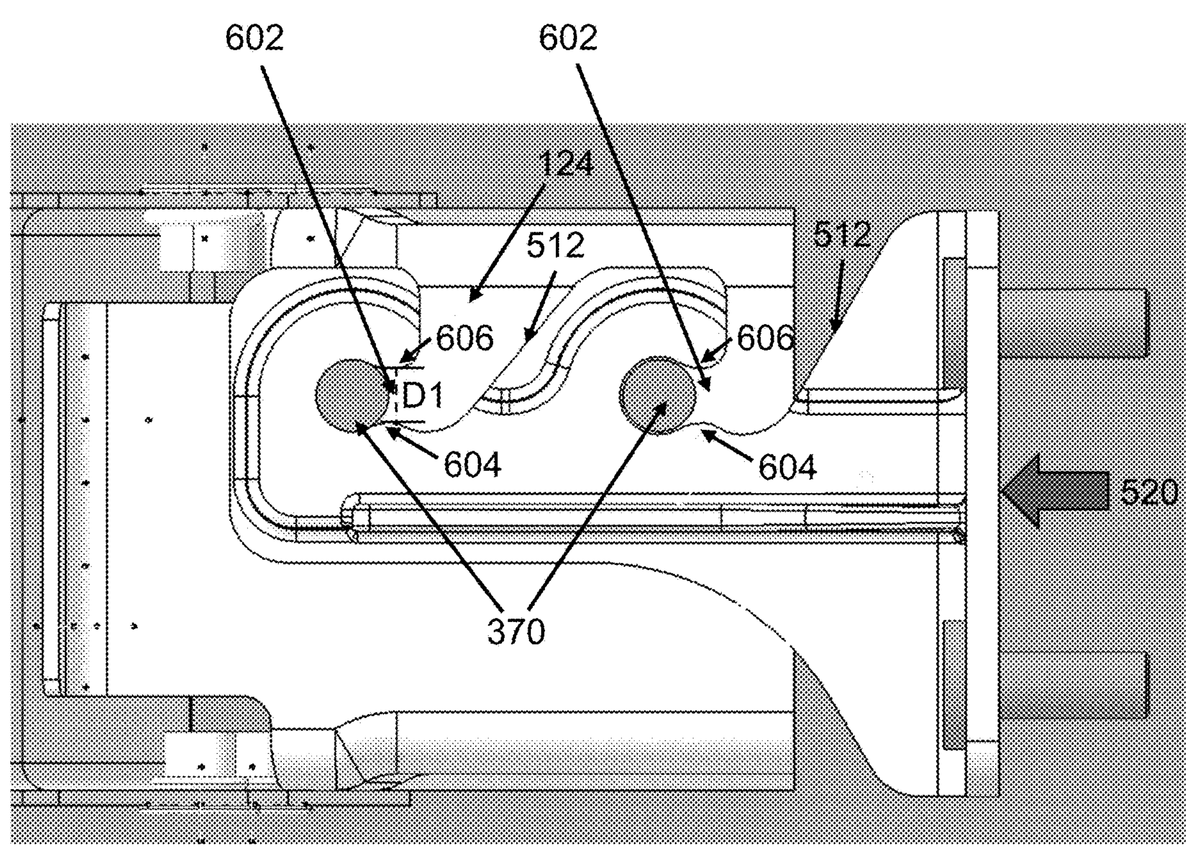

In the event of a frontal impact, energy may be transferred to the bull bar drop-down mounting structure 350 in direction 520. If this energy is sufficient (such as generated in a serious accident), the bull bar drop-down mounting structure 350 may disconnect from the vehicle frame 124. In some cases, this may cause the bull bar drop-down mounting structure 350 to move in direction 520, causing bolts 370 to pass through the openings 602 with width D1 from the circular portion of the cutouts 510 (which may cause deformation or shearing of the portions 604, 606 (shown in FIG. 7), such that the bolts 370 then bear against the ramps 512. This pressure may push the bull bar drop-down mounting structure 350 in a downward direction 530 which may be transferred to the bull bar, ultimately forcing the bull bar to drop down. In this case, the bull bar does not transfer all of the energy from the impact to the vehicle frame as is the case with a rigid mounting scheme without a bull bar drop-down mounting structure 350. As discussed above, the drop-down action may be advantageous for mitigating damage to the vehicle, and in particular, damage to the vehicle frame. In some implementations, width D1 may be about 10 mm. A front impact that does not have enough energy to force the bolts 370 through openings 602 (such as a minor accident or a minor collision with an object) will not cause the bull bar drop-down mounting structure 350 to disconnect from the vehicle frame 124. This may be advantageous because the bull bar may be used normally for its intended purpose to protect the vehicle or carry equipment in cases other than a serious accident.

Figure 6:
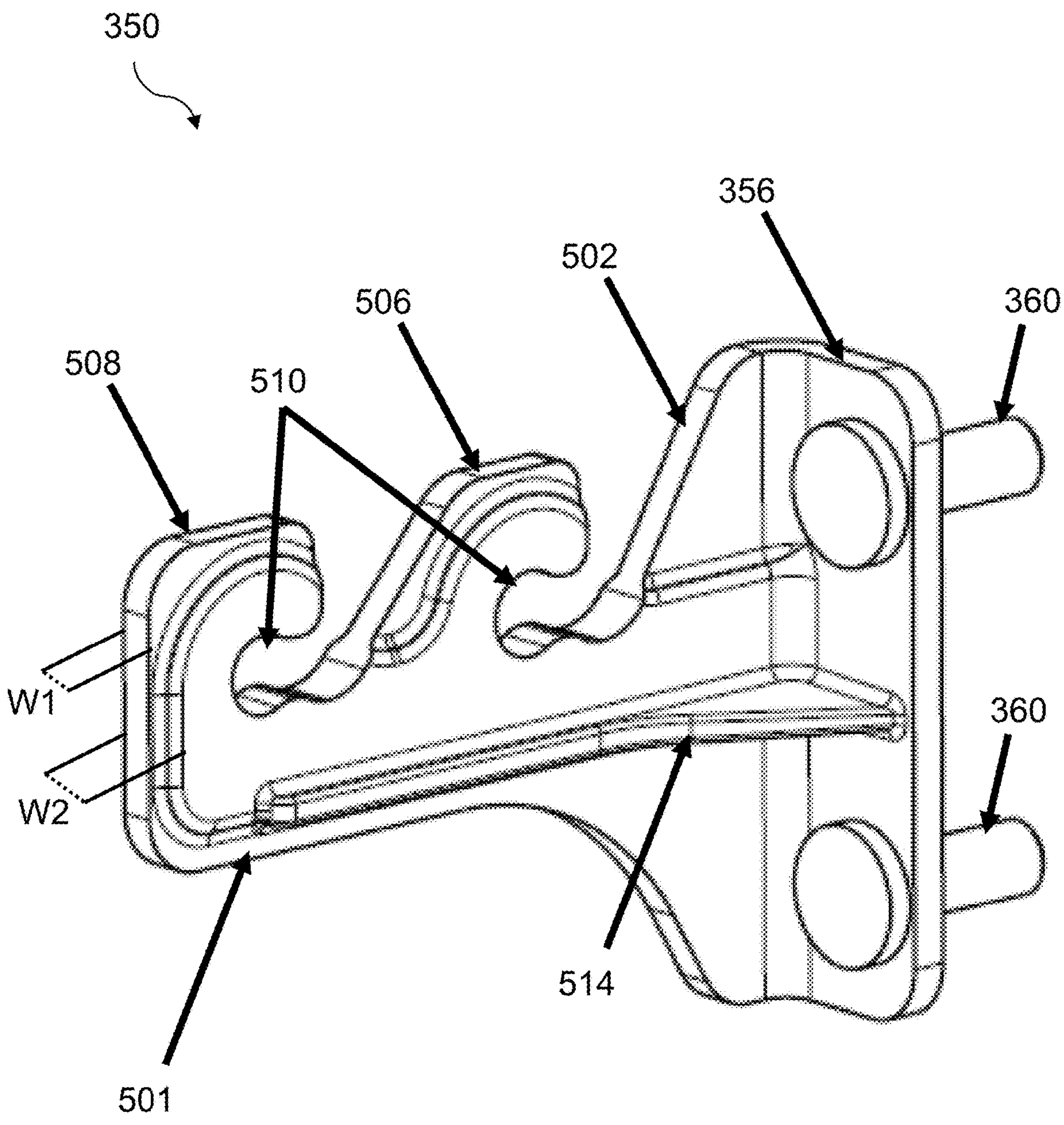
FIG. 6 is a perspective view of a bull bar drop-down structure according to embodiments of the present invention.

FIG. 6 is a perspective view of the bull bar drop-down mounting structure 350. As shown in this view, the flange 356 extends out from the main body 501 of the bull bar drop-down mounting structure 350, such as at a 90 degree angle. The shape of the rib 514 is also shown, connecting the main body 501 to the flange 356. In some implementations, the rib 514 has a curved profile with a thin portion along the main body 501 that gradually widens closer to the flange 356. The rib 514 may add rigidity to the bull bar drop-down mounting structure 350 while still leaving room to accommodate other features and allow access to bolts 360 as well as other connecting devices. The flange 356 may be connected to a proximal portion 502 of the main body. In some implementations, the flange 356 and proximal portion 502 are integrally formed, such as in the case that the bull bar drop-down mounting structure 350 is formed from a single piece of metal that has been bent at a 90 degree angle to form the flange 356. In other implementations, the flange 356 is welded or bolted onto the main body 501.

In some implementations, the width of the bull bar drop-down mounting structure 350 varies in different locations. For example, the outer edges of the first extension 506 and the second extension 508 may have a first width W1 and a second width W2 on an inner edge around cutout 510. The bottom portion of the main body 501 may also be formed with the width W1. In the example shown in FIGS. 5 and 6, width W1 is smaller than width W2. This arrangement may help to provide additional strength and rigidity to the bull bar drop-down mounting structure 350 in areas where it is bolted to the vehicle frame, while also minimizing weight in other locations that are not likely to experience as much stress.

Figure 8:
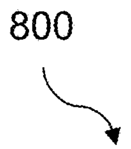
FIG. 8 is a flowchart illustrating a method for mounting a bull bar to a vehicle frame using a bull bar drop-down structure according to embodiments of the present disclosure.
Figure 8:
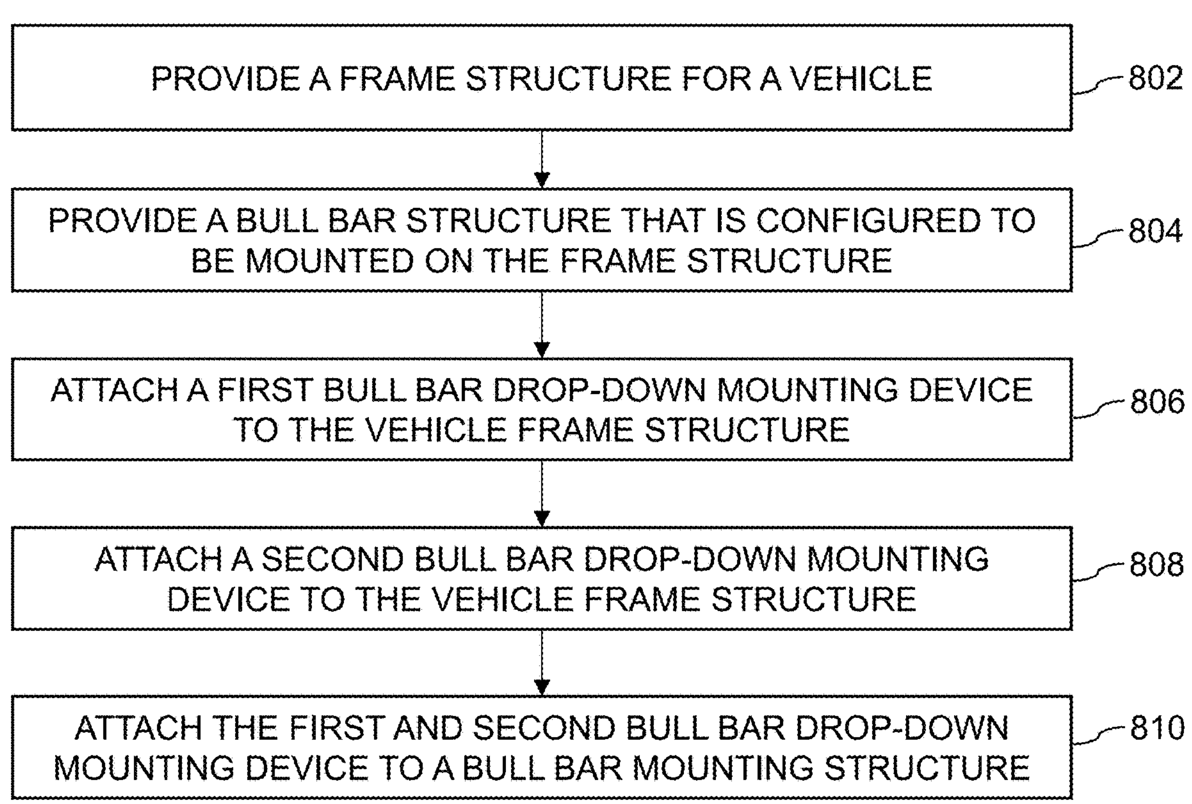

FIG. 8 shows a method 800 for attaching a bull bar to a vehicle with a bull bar drop-down mounting device (such as the bull bar drop-down mounting structure 350, 352 shown in FIGS. 3-6). The method 800 may include block 802 to provide a frame structure for a vehicle. This frame structure may components such as frame rails with mounting structures for mounting a bumper, crash bar, bull bar, or other structure on the front portion of the vehicle.

In block 804, the method 800 may include providing a bull bar structure that is configured to be mounted on the frame structure. This bull bar may include a rigid bull bar, a main structure, and mounting structures such as those shown in FIGS. 3 and 4.

In block 806, the method 800 may include attaching a first bull bar drop-down mounting device to the vehicle frame structure. The first bull bar drop-down mounting device may be the bull bar drop-down mounting structure 350 shown in FIGS. 3-6 and may be attached to the vehicle frame rigidly with mounting devices such as bolts. These bolts may pass through a cutout portion of the first bull bar drop-down mounting device, the cutout portion having a circular portion as well as a ramped portion. The first bull bar drop-down mounting device may have a first extension and a second extension, as well as a flange extending out from the body of the bull bar drop-down mounting device at approximately 90 degrees.

In block 808, the method 800 may include attaching a second bull bar drop-down mounting device to the vehicle frame structure. In some implementations, the second bull bar drop-down mounting device is attached to an opposite side of the frame structure as the first bull bar drop-down mounting device (such as an opposite side of a frame rail), and may appear as a mirror image of the first bull bar drop-down mounting device. The second bull bar drop-down mounting device may be the bull bar drop-down mounting structure 352 shown in FIGS. 3-7 and may be attached to the vehicle frame rigidly with mounting devices such as bolts. Similar to the first bull bar drop-down mounting device, these bolts may pass through a cutout portion of the second bull bar drop-down mounting device, the cutout portion having a circular portion as well as a ramped portion. The second bull bar drop-down mounting device may also include a first extension and a second extension, as well as a flange extending out from the body of the bull bar drop-down mounting device at approximately 90 degrees. As shown in FIGS. 3 and 4, the flange of the first bull bar drop-down mounting device and the second bull bar drop-down mounting device may extend out from the frame rail in opposite directions.

In block 810, the method 800 may include attaching the first and second bull bar drop-down mounting devices to a bull bar mounting structure. This step may include passing bolts through the flanges of the first and second bull bar drop-down mounting devices and through the bull bar mounting device to rigidly attach these devices. The first and second bull bar drop-down mounting devices may be arranged such that in the event of a frontal collision, force from the bull bar is transferred to the first and second bull bar drop-down mounting devices through the rigid connection between the first and second bull bar drop-down mounting devices and the bull bar mounting structure. If this force is sufficiently strong, the first and second bull bar drop-down mounting devices will detach from the vehicle mounting structure, such that the bolts attached to the vehicle mounting structure bear against the ramps on the first and second bull bar drop-down mounting devices and ultimately force the bull bar to drop down below the level of the vehicle mounting structure. This may avoid costly damage to the frame as well as other components of the vehicle. A second set of bull bar drop-down mounting devices may also be attached to the vehicle mounting structure and the bull bar mounting structure, as shown in FIGS. 3 and 4.

The foregoing outlines features of several implementations so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes and/or achieving the same advantages of the implementations introduced herein. One of ordinary skill in the art should also realize that such equivalent constructions do not depart from the spirit and scope of the present disclosure, and that they may make various changes, substitutions and alterations herein without departing from the spirit and scope of the present disclosure.

The Abstract at the end of this disclosure is provided to comply with 37 C.F.R. § 1.72(b) to allow the reader to quickly ascertain the nature of the technical disclosure. It is submitted with the understanding that it will not be used to interpret or limit the scope or meaning of the claims.

Moreover, it is the express intention of the applicant not to invoke 35 U.S.C. § 112(f) for any limitations of any of the claims herein, except for those in which the claim expressly uses the word "means" together with an associated function.

What is claimed is:

1. A mounting device for attaching a bull bar to a vehicle, comprising:

a first bracket comprising:

a first base structure configured to be rigidly mounted to a frame structure of the vehicle, wherein the first base structure comprises a proximal portion, a first extension in a middle portion of the first base structure, and a second extension at a distal end of the first base structure; and a first flange configured to be rigidly mounted to the bull bar, the first flange connected to the proximal portion of the first base structure, the first flange extending perpendicular to first base structure; and a second bracket comprising:

a second base structure configured to be rigidly mounted to the frame structure of the vehicle, wherein the second base structure comprises a proximal portion, a third extension in a middle portion of the second base structure, and a fourth extension at a distal end of the second base structure; and a second flange configured to be rigidly mounted to the bull bar, the second flange connected to the proximal portion of the second base structure, the second flange extending perpendicular to second base structure.

2. The mounting device of claim 1, wherein the proximal portion of the first base structure and the first extension each comprise a ramped shape configured to force the bull bar to drop during a frontal crash.

3. The mounting device of claim 1, wherein the proximal portion of the second base structure and the third extension each comprise a ramped shape configured to force the bull bar to drop during a frontal crash.

4. The mounting device of claim 1, further comprising one or more bolts that pass through the first flange and the bull bar, the one or more bolts configured to rigidly attach the first bracket to the bull bar.

5. The mounting device of claim 1, further comprising one or more bolts that pass through the second flange and the bull bar, the one or more bolts configured to rigidly attach the second bracket to the bull bar.

6. The mounting device of claim 1, wherein the first extension and the second extension both include semicircular cutouts configured to allow bolts to pass therethrough to rigidly attach the first bracket to the frame structure of the vehicle.

7. The mounting device of claim 1, wherein the third extension and the fourth extension both include semicircular cutouts configured to allow bolts to pass therethrough to rigidly attach the second bracket to the frame structure of the vehicle.

8. The mounting device of claim 1, further comprising a first rib extending along and connecting together a central portion of the first base structure and the first flange.

9. The mounting device of claim 1, further comprising a second rib extending along and connecting together a central portion of the second base structure and the second flange.

10. The mounting device of claim 1, wherein the first flange and the second flange extend in opposite directions.

11. The mounting device of claim 1, wherein the first base structure and the second base structure extend parallel to each other.

12. A mounting system for attaching a bull bar to a vehicle, comprising:

a vehicle frame structure with a first mounting structure;

a first bracket comprising a first base structure with a first proximal portion, a first extension, a second extension, and a first flange extending perpendicular to the first proximal portion of the first bracket;

a second bracket comprising a second base structure with a second proximal portion, a third extension, a fourth extension, and a second flange extending perpendicular to the second proximal portion of the second bracket; and a bull bar with a second mounting structure, wherein the first bracket and the second bracket are rigidly connected to the first mounting structure and the second mounting structure.

13. The mounting system of claim 12, wherein the first proximal portion of the first base structure and the first extension each comprise a ramped shape configured to force the bull bar to drop during a frontal crash.

14. The mounting system of claim 12, wherein the second proximal portion of the second base structure and the third extension each comprise a ramped shape configured to force the bull bar to drop during a frontal crash.

15. The mounting system of claim 12, further comprising one or more bolts that pass through the first flange and the bull bar, the one or more bolts configured to rigidly attach the first bracket to the bull bar.

16. The mounting system of claim 12, further comprising one or more bolts that pass through the second flange and the bull bar, the one or more bolts configured to rigidly attach the second bracket to the bull bar.

17. The mounting system of claim 16, wherein the one or more bolts are configured to shear off during a frontal accident, causing the bull bar to drop below the vehicle frame structure.

18. A method for attaching a bull bar to a vehicle, comprising:

providing a vehicle frame with a first mounting structure;

attaching a first bracket to the first mounting structure by passing one or more bolts through a first cutout and a second cutout in the first bracket and into one or more holes in the first mounting structure;

attaching a second bracket to the first mounting structure by passing one or more bolts through a third cutout and a fourth cutout in the second bracket and into one or more holes in the first mounting structure;

attaching the first bracket to a bull bar mounting structure; and attaching the second bracket to the bull bar mounting structure, wherein the first, second, third, and fourth cutouts are configured to force the bull bar to drop in an event of a frontal crash.

19. The method of claim 18, further comprising attaching the first bracket to the bull bar mounting structure by passing one or more bolts through holes in a first flange of the first bracket and through one or more holes in the bull bar mounting structure; and attaching the second bracket to the bull bar mounting structure by passing one or more bolts through holes in a second flange of the second bracket and through one or more holes in the bull bar mounting structure.

20. The method of claim 18, wherein each of the first, second, third, and fourth cutouts comprise a ramped shape.

* * * * *